W. LEWIS.
MOLDING MACHINE.
APPLICATION FILED MAR. 2, 1908.

951,953.

Patented Mar. 15, 1910.
4 SHEETS—SHEET 4.

UNITED STATES PATENT OFFICE.

WILFRED LEWIS, OF PHILADELPHIA, PENNSYLVANIA, ASSIGNOR TO THE TABOR MANUFACTURING COMPANY, OF PHILADELPHIA, PENNSYLVANIA, A CORPORATION OF NEW JERSEY.

MOLDING-MACHINE.

951,953.     Specification of Letters Patent.     Patented Mar. 15, 1910.

Application filed March 2, 1908. Serial No. 418,659.

*To all whom it may concern:*

Be it known that I, WILFRED LEWIS, a citizen of the United States, residing at the city of Philadelphia, in the county of Philadelphia and State of Pennsylvania, have invented certain new and useful Improvements in Molding-Machines, of which the following is a specification.

The principal object of the present invention is to provide simple, efficient and reliable means for operating such hinge frames of molding machines as are too heavy to be properly handled by men, and to this and other ends hereinafter set forth the invention comprises the improvements to be presently described and finally claimed.

In the following description reference is made to the accompanying drawings in which—

Figure 1:
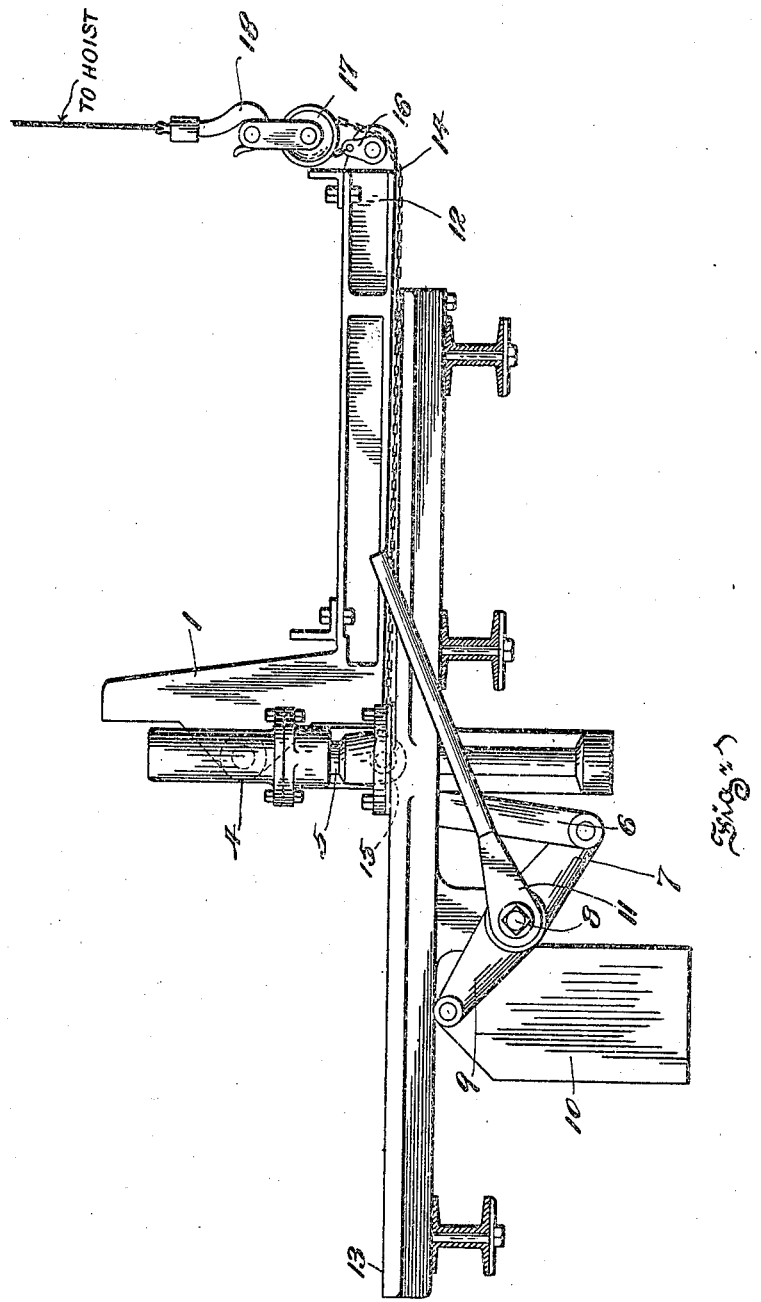
Figure 2:
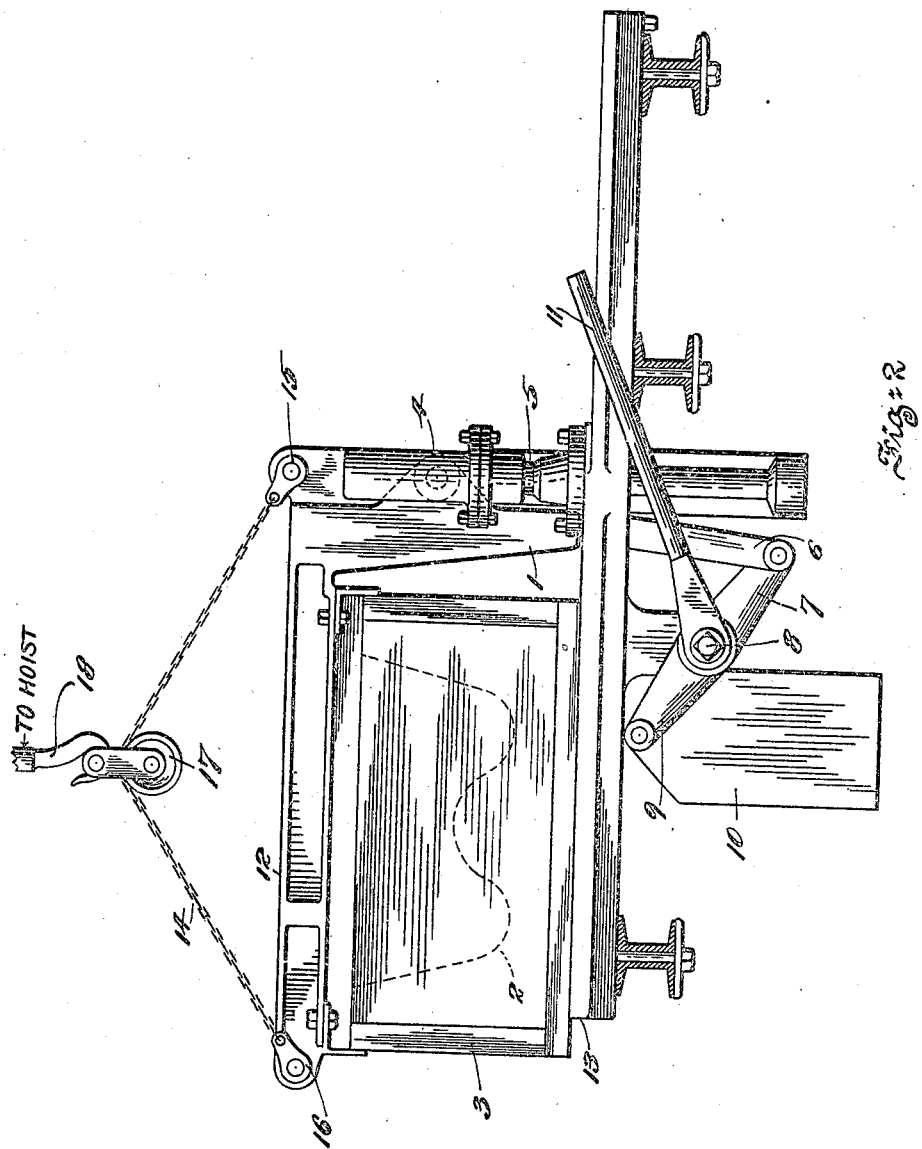
Figure 3:
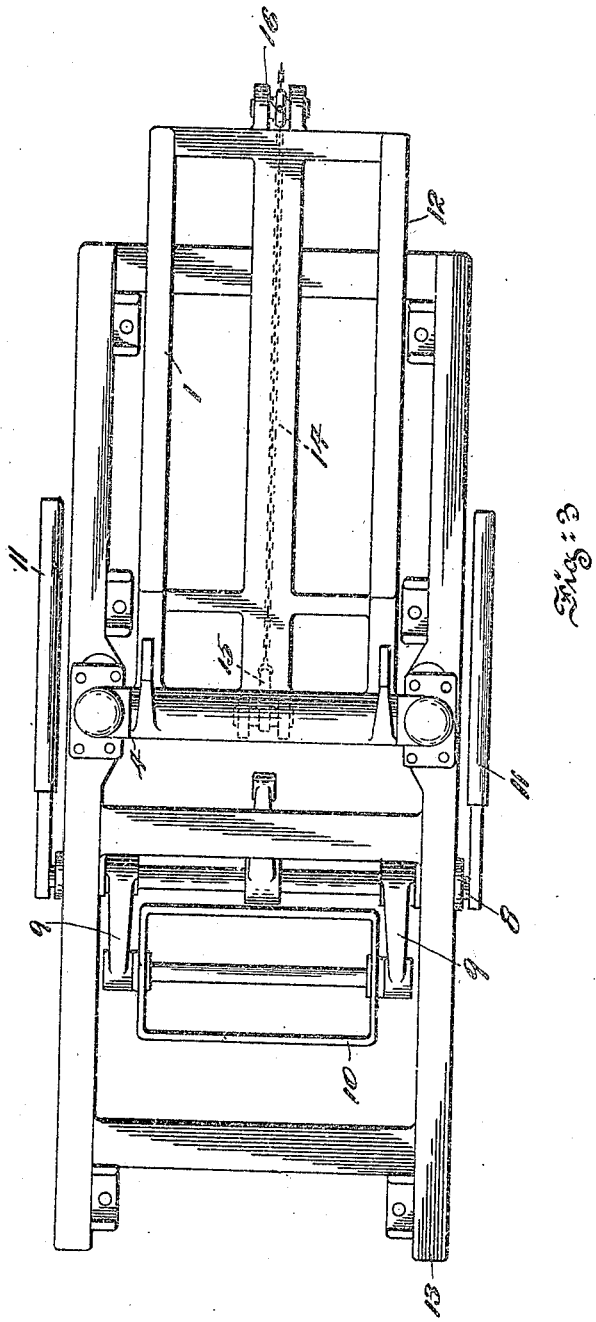
Figure 4:
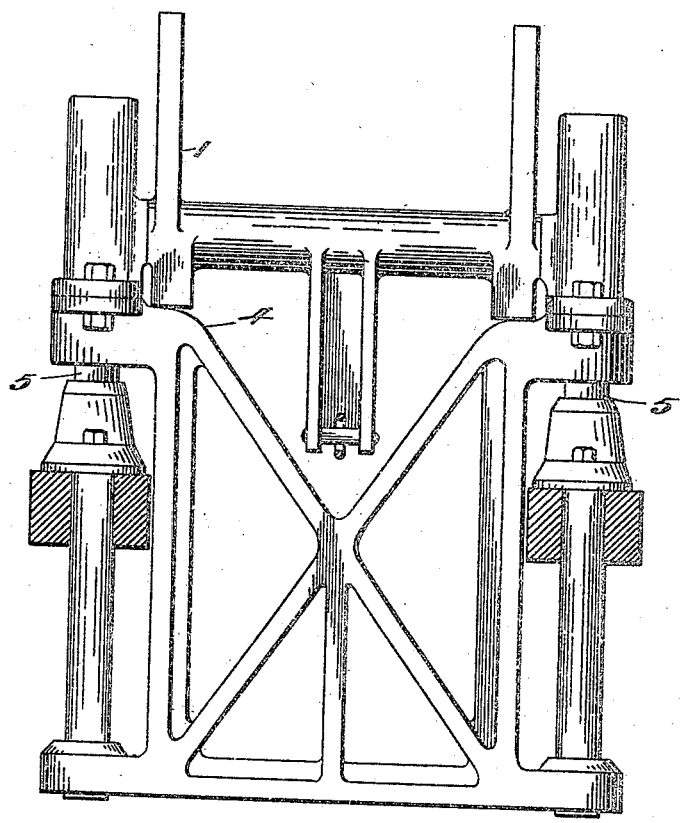

Figure 1, is a side elevational view of a molding machine embodying features of the invention and showing the carrier for the flasks and patterns at rest upon one of its supports. Fig. 2, is a similar view showing the carrier at rest upon the other of its supports. Fig. 3, is a top or plan view of the machine, and Fig. 4, is an end view of the same.

The invention is illustrated in the drawings in connection with a molding machine of the type described in Letters Patent No. 824,317 to Harris Tabor, and it is well adapted for use in connection with such a machine though possibly applicable in whole or in part to other rock-over molding machines.

Before proceeding to describe the mechanism which embodies the invention, I will point out, briefly, the parts of the patented machine with which it especially coöperates.

In the drawings 1, is a carrier upon one side or face of which there is arranged a pattern 2, and a flask 3. The latter is detachably clamped to the carrier in any preferred manner and the pattern may be connected with the carrier in a variety of ways. The carrier is hinged to a frame or member 4, which is movable in the sense that it may slide on guides 5. The member or frame 4, is shown as connected by a link 6, with an arm 7, on a rock shaft 8, provided with other arms 9, that carry a counterweight 10.

11, is a ratchet wrench which may be used for turning the rock shaft and thus elevating the member or frame 4, so as to lift it and with it the carrier when the latter is in the position shown in Fig. 2, so as to draw the pattern in vertical direction. The flask is rammed when the carrier is in the position shown in Fig. 1, that is, resting upon its support 12. Thereafter the carrier is turned into the position shown in Fig. 2, onto its support 13, where it is accommodated in the manner described in said Tabor patent. The pattern is drawn by lifting the carrier vertically during which movement the frame or member 4, is guided by its guides 5.

Having thus indicated parts of the patented machine, I will proceed with a description of the mechanism which embodies the present invention.

14, is a connection secured to the carrier 1, and arranged on the side or face thereof opposite to the side or face which receives the pattern and flask. This connection is shown to comprise a chain or cord secured to lugs 15 and 16, arranged at the ends of the carrier and this chain or cord is so long that a bight of it may extend past the free end of the carrier as shown in Fig. 1.

17, is a runner adapted to work on the connection 14, and it is shown to comprise a sheave. This runner or sheave 17, is connected with an overhead crane or hoist 18. The flask 3, is filled with sand and rammed and otherwise prepared while the carrier 1, is in the position shown in Fig. 1. The free end of the carrier 1, is then lifted by the crane or hoist 18, acting through the instrumentality of the connection 14, and runner 17. When the flask and carrier have been turned to the balancing point, the flask and carrier tumble over or turn and the sheave or runner travels along the connection or chain to the center position as shown in Fig. 2. This position is approximately over the center of gravity of the whole mass which can then be lowered so that the flask is landed fairly and squarely on the portion 13, of the bed of the machine. During this operation the movable member or sliding frame 4, may be raised and permitted to descend. The flask may be unclamped from the carrier and the hoist and described connections employed for drawing the pattern by lifting the carrier and movable member or frame 4. When the pattern draft is completed, the sliding frame or member 4, comes to the limit of its range of upward movement and the sheave or runner 17, travels back along the chain or connection 14, drawing or turning the carrier to the balancing position after which it may be lowered to its original position shown in Fig. 1.

What I claim is:

1. The combination in a molding machine of a carrier for flasks and patterns and the movable member to which it is marginally hinged of a connection secured at its end to the carrier and arranged on the side or face thereof opposite to the flask or pattern, a runner on said connection, and a hoist or crane connected with the runner whereby the carrier is lifted parallel to itself to draw a pattern, substantially as described.

2. The combination in a molding machine of a carrier for flasks or patterns and a slidable member to which it is hinged and the two supports onto which it is turned of a chain secured to the ends of the carrier and arranged on the side or face thereof opposite the flask and pattern with its bight adapted to extend above the free end of the carrier, a sheave on said chain, and a hoist or crane connected with the sheave, substantially as described.

3. The combination in a molding machine of the vertically movable guided frame having hinged thereto a carrier of a connection applied to the carrier, a runner on and freely movable endwise of the connection, and an overhead hoist or crane, substantially as described.

In testimony whereof I have hereunto signed my name.

WILFRED LEWIS.

Witnesses:
  W. J. JACKSON,
  FRANK E. FRENCH.